A. D. THOMPSON & J. MARDEN, Jr.

Velocipede.

No. 86,787. Patented Feb. 9, 1869.

UNITED STATES PATENT OFFICE.

ABRAHAM D. THOMPSON AND JESSE MARDEN, JR., OF BALTIMORE, MARYLAND.

Letters Patent No. 86,787, dated February 9, 1869.

IMPROVED VELOCIPEDE.

The Schedule referred to in these Letters Patent and making part of the same.

*To all whom it may concern:*

Be it known that we, ABRAHAM D. THOMPSON and JESSE MARDEN, Jr., of the city and county of Baltimore, and State of Maryland, have invented a new and improved Velocipede; and we do hereby declare that the following is a full, clear, and exact description of the construction and operation of the same, reference being had to the accompanying drawings, making a part of this specification, in which—

Figure 1:
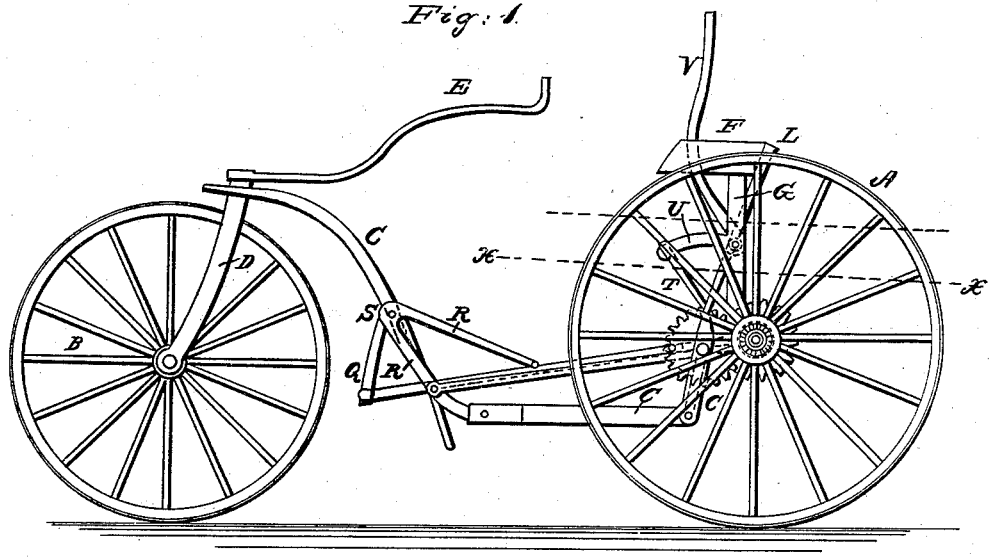
Figure 1 is a side view.
Figure 2:
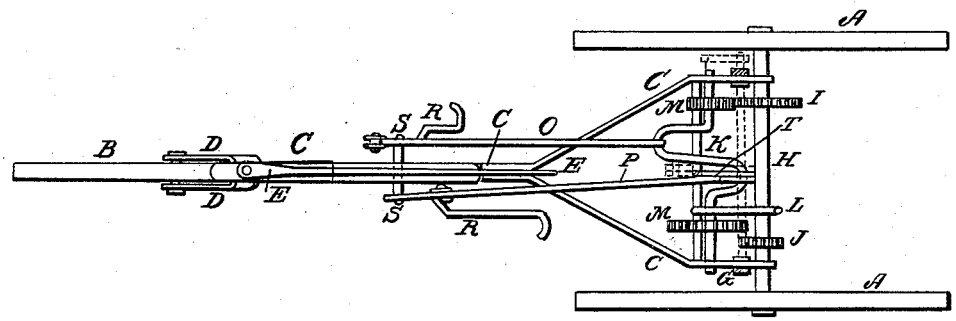
Figure 2 is a top view.

The object of this invention is to so improve the construction of three-wheel velocipedes that their speed, and the power necessary to move them, can be adjusted and changed without changing the movement of the pedals, and that they can be operated either by foot or by hand, or by both together. In attaining these ends, the general construction of the vehicle has been so changed and improved that several other important advantages result therefrom.

In the drawings—

A A represent the two hind wheels, and

B, the fore wheel, which is also the steering-wheel, being connected to the reach C by means of an upright standard, D, capable of being turned to the right, or left, on its vertical axis, by means of a lever, E.

F is the seat, supported upon standards, G G, fixed to the bifurcated rear end of the reach.

H is the axle of the rear wheels, being firmly fixed to one or both of said wheels, and having two pinions, I J, one large and the other small, rigidly attached by a key, or other suitable means.

K is a double crank-shaft, bearing in boxes or sockets in the reach, just in front of the rear axle, the reach being bifurcated at that end, in order to form a more substantial connection with the rear axle, and, at the same time, to support and accommodate this crank-shaft.

The crank-shaft has two pinions, M N, firmly fixed to it, at such a distance from each other that, when one of them is in gear with the pinion I or J, on the axle, the other is not in gear with the other pinion or the axle.

The pinions M and N are of unequal size, the smaller one, N, being arranged to work in connection with the large pinion of the axle, and the larger one, M, to work in connection with the small pinion of the axle.

The pinions M and N may be so arranged on the crank-shaft that one of them shall always be in gear with one of the rear pinions; or they may be so arranged that when the crank-shaft is in a certain position, both will be out of gear; when in another position, the two wheels N I shall be in gear; and, when in another position, the two, M J, shall be in gear.

The crank-shaft is capable of a sufficient longitudinal sliding movement to throw the pinions into or out of gear, as required.

L is a lever, by which it can be thus moved, said lever extending up behind the seat, so as to be conveniently handled, although not in the driver's way.

The object of this gear-arrangement is to change the power and velocity at pleasure, so that, while going down hill, or on level ground, the power may be applied through the wheels M J, and great velocity be imparted to the vehicle; and, when going up hill, it may be applied to greater advantage through the other gear-wheels, N I, producing less speed, but requiring an outlay of less force.

The power is applied to the crank-shaft by means of two pitmen, O P, connected with the double cranks at one end, and articulated, at the other, to foot-levers, or treadles, Q R, each of which is pivoted to the reach at s, and from that point extends backward and downward, so as to be in a convenient position to be operated by the driver sitting in the seat F.

Another pitman, T, may be connected with one of the cranks, at its lower end, and, at its upper, articulated to an arm, U, fixed to a rock-bar, the rock-bar having a vertical lever, V, fixed to one end, by which the driver can rock it, throwing up or down the arm U, and thereby imparting motion to the crank-shaft and to the carriage.

This hand-power apparatus may be employed in lieu of the treadles occasionally, and in connection with them when going up hill, if it be desired to apply more power than can be conveniently applied through the treadles and their connected apparatus. The hand-lever V also enables the cranks to pass the dead-points without difficulty.

If necessary, the seat can be braced by a suitable bar or rod, running downward and forward to the reach, and the standard D can be more rigidly braced than is represented in the drawings. Such matters of detail in construction, however, we regard as within range of the skill of any ordinary mechanic, and do not deem it necessary to describe them here.

The whole apparatus is exceedingly light, strong, and durable, and can be constructed at little expense, and operated with less power, and with less fatigue to the operator, than anything hitherto brought before the public.

We do not claim to be the inventors of movable gearing, similar to that here shown and described, when applied to other purposes than that herein set forth; but What we do claim as our invention, and desire to secure by Letters Patent, is—

In a velocipede, and for the purpose described, the combination of the sliding crank-shaft K, bearing-pinions N M, of unequal size, with the axle H, bearing-pinions I J, of unequal size, the pinions I J M N being arranged with relation to each other, in the manner described.

To the above specification of our improvement, we have set our hands, this 15th day of January, 1869.

ABRAHAM D. THOMPSON.
JESSE MARDEN, JR.

Witnesses:
WM. MAGILL,
JESSE MARDEN.